(12) United States Patent
Springett et al.

(10) Patent No.: US 6,827,764 B2
(45) Date of Patent: Dec. 7, 2004

(54) MOLDED FILTER ELEMENT THAT CONTAINS THERMALLY BONDED STAPLE FIBERS AND ELECTRICALLY-CHARGED MICROFIBERS

(75) Inventors: James E. Springett, Hudson, WI (US); Seyed Abolhassan Angadjivand, Woodbury, MN (US)

(73) Assignee: 3M Innovative Properties Company, St. Paul, MN (US)

(*) Notice: Subject to any disclaimer, the term of this patent is extended or adjusted under 35 U.S.C. 154(b) by 6 days.

(21) Appl. No.: 10/205,565

(22) Filed: Jul. 25, 2002

(65) Prior Publication Data
US 2004/0016345 A1 Jan. 29, 2004

(51) Int. Cl.[7] .................. B01D 39/02; B03C 3/00
(52) U.S. Cl. .................. 96/66; 96/68; 55/522; 55/524; 55/527; 55/528; 55/DIG. 5; 55/DIG. 35; 55/DIG. 39; 264/239; 264/280; 264/DIG. 48; 428/360; 428/362; 428/369; 428/373; 442/344; 442/352; 442/353; 442/361; 442/411
(58) Field of Search .................. 55/522, 524, 527, 55/528, 529, DIG. 5, DIG. 35, DIG. 39; 264/239, 280, DIG. 48; 428/360, 362, 369, 373; 442/349, 352, 353, 361, 411; 96/66, 68

(56) References Cited

U.S. PATENT DOCUMENTS

| | | |
|---|---|---|
| 3,016,599 A * | 1/1962 | Perry, Jr. .................. 428/359 |
| 3,644,605 A | 2/1972 | Sessler et al. |
| 3,998,916 A | 12/1976 | van Turnhout |
| 4,118,531 A * | 10/1978 | Hauser .................. 442/352 |
| 4,178,157 A | 12/1979 | van Turnhout et al. |
| 4,215,682 A | 8/1980 | Kubik et al. |
| 4,536,440 A | 8/1985 | Berg |
| 4,547,420 A | 10/1985 | Krueger et al. |
| 4,588,537 A | 5/1986 | Klaase et al. |
| 4,729,371 A | 3/1988 | Krueger et al. |
| 4,795,668 A | 1/1989 | Krueger et al. |
| 4,798,850 A | 1/1989 | Brown |
| 4,807,619 A | 2/1989 | Dyrud et al. |
| 4,850,347 A | 7/1989 | Skov |
| 4,874,399 A | 10/1989 | Reed et al. |
| 4,988,560 A | 1/1991 | Meyer et al. |
| 5,227,172 A | 7/1993 | Deeds |
| 5,307,796 A | 5/1994 | Kronzer et al. |
| 5,350,620 A * | 9/1994 | Sundet et al. .................. 55/527 |
| 5,419,953 A | 5/1995 | Chapman |
| 5,496,507 A | 3/1996 | Angadjivand et al. |
| 5,607,491 A | 3/1997 | Jackson et al. |
| 5,641,555 A * | 6/1997 | Berrigan et al. .................. 428/152 |
| 5,656,368 A | 8/1997 | Braun et al. |
| 5,763,078 A | 6/1998 | Braun et al. |
| 5,817,584 A * | 10/1998 | Singer et al. .................. 442/361 |
| 5,841,081 A | 11/1998 | Thompson et al. |
| 5,898,981 A | 5/1999 | Legare |
| 5,919,847 A | 7/1999 | Rousseau et al. |
| 5,968,635 A * | 10/1999 | Rousseau et al. .................. 428/198 |
| 5,976,427 A * | 11/1999 | Choi .................. 264/6 |
| 6,057,256 A | 5/2000 | Krueger et al. |
| 6,123,077 A | 9/2000 | Bostock et al. |
| 6,197,709 B1 | 3/2001 | Tsai et al. |
| 6,270,709 B1 * | 8/2001 | Akki et al. .................. 264/205 |
| 6,427,693 B1 | 8/2002 | Blackstock et al. |

FOREIGN PATENT DOCUMENTS

| | | |
|---|---|---|
| EP | 0 325 854 A1 | 8/1989 |
| EP | 0 428 400 A1 | 5/1991 |
| WO | WO 00/01737 | 1/2000 |

* cited by examiner

*Primary Examiner*—Duane Smith
*Assistant Examiner*—Jason M. Greene
(74) *Attorney, Agent, or Firm*—Karl G. Hanson (57) ABSTRACT

A filter element that comprises a porous molded web 10' that contains thermally bonded staple fibers 12 and non-thermally bonded electrically charged microfibers 14. The molded web is retained in its molded configuration, at least in part, by bonds between the staple fibers 12 at points of fiber intersection 13. The web may be molded, for example, into the shape of filtering face mask 16.

54 Claims, 5 Drawing Sheets

MOLDED FILTER ELEMENT THAT CONTAINS THERMALLY BONDED STAPLE FIBERS AND ELECTRICALLY-CHARGED MICROFIBERS

The present invention pertains to a molded filter element that includes thermally-bonded staple fibers and non-thermally bonded electrically-charged microfibers. Filter elements of this invention may be used in face masks that protect the wearer and others from exposure to contaminants.

BACKGROUND

Filter elements that use microfibers to capture airborne particulates have been known and used for many years. The microfiber-containing filter elements are commonly used in respirators to supply clean filtered air to the wearer—see, for example, U.S. Pat. No. 5,656,368 to Braun et al., U.S. Pat. No. 5,307,796 to Kronzer et al., and U.S. Pat. No. 4,729,371 to Krueger et al. An electric charge is typically placed on the microfibers to improve their capturing efficiency. In 1980, Kubik et al. described a method for introducing a persistent electric charge into meltblown microfibers during fiber formation (see U.S. Pat. No. 4,215,682). After the Kubik et al. development, other charging techniques were developed for making electret microfibers—see, for example, U.S. Pat. Nos. 4,588,537 to Klaase et al., 5,227,172 to Deeds et al., and 5,496,507 to Angadjivand et al.

When used as a filter element, webs of electrically-charged microfibers have been commonly supported by another structure. Although the webs typically possess sufficient integrity to be handleable by themselves as a mat, they do not possess sufficient structural stiffness to exhibit more than transitory shape retention. Thus, in respirators, the microfiber-containing filter webs are regularly supported by a permanently-molded shaping layer. The filter web is positioned over the shaping layer and is secured to it to assume its molded configuration. Examples of patents that disclose the use of a separate shaping layer to support a microfiber-containing filter layer in a respirator include U.S. Pat. Nos. 4,536,440 to Berg, 4,807,619 to Dyrud et al., and 4,850,347 to Skov.

In the Berg and Dyrud et al. patents, the shaping layer comprises fibers that are bonded to one another and to other fibers at points of fiber intersection throughout the molded web. The fibers that are used to achieve the desired molded configuration of the shaping layer preferably are thermally-bondable bicomponent fibers that are rather course or large in size, that is, 10 denier or larger. In Skov, the shaping layer takes the form of an open-work molded plastic mesh.

In addition to these structures, filtering webs of polymeric microfiber also have been retained in a shaped configuration through use of fabrics, spaced bands, filaments, or fibers—see U.S. Pat. No. 5,656,368 to Braun et al., which describes placing these shape-retaining elements across the tops of corrugations in a nonwoven web to maintain its corrugated condition. Braun et al. also explain that nonwoven webs of polymeric microfiber need to be maintained in a lofty condition in order to obtain optimal filtration performance. Filtration parameters such as pressure drop and service life can be negatively impacted when webs of polymeric microfiber are compacted.

In yet another approach to maintaining the shape of a nonwoven web of microfibers, the shape retention is provided not by an external structure such as a shaping layer but instead by the microfibers themselves. In this approach, which is described in U.S. Pat. No. 6,057,256 to Krueger et al., the microfibers are made from two components: the first being a fiber support component, and the second being a thermo-softening or bonding component. During molding, the web is heated to a temperature greater than the second component's softening temperature to create bonds between adjacent fibers. The bonds occur where the softened components engage each other at points of fiber intersection. Thus, while the first component provides the fibrous support to the web, which prevents it from collapsing or coalescing, the second component allows it to be molded into a particular shape. The product may also include staple fibers to open or loosen the web.

With the exception of the bicomponent microfiber product described by Krueger et al., the means for supporting and providing shape to a microfiber-containing filter web is achieved by a separate or non-integral supporting structure. These products therefore require that the microfiber-containing web be manufactured separate from the supporting structure and also require that there be an apparatus for joining the two elements together to create the resulting composite article. The use of these additional manufacturing steps, and the need for the additional manufacturing equipment to accomplish these steps, adds to the final cost of the product. In addition, care needs to be taken when handling the microfiber-containing webs so that the webs do not become damaged and suffer a loss in filtration performance as taught by Braun et al.

Although Krueger et al. were able to achieve a molded microfiber-containing filter element without using a separate supporting structure, their product, however, relies on the microfiber itself for furnishing the structure to the mask. When the microfibers become bonded together for this purpose, they have a tendency to not fully serve their primary mission of filtering particles from the airstream that passes through the web.

SUMMARY OF THE INVENTION

The present invention provides, in brief summary, a new filter element that may suitably comprise or consists essentially of a porous molded web that contains thermally bonded staple fibers and non-thermally bonded electrically-charged microfibers. The molded web is retained on its molded configuration, at least in part, by bonds between the staple fibers at points of fiber intersection.

The filter element of the invention allows a shaped structure to be created without using of a separate supporting structure. The inventive filter element also does not need to bond the microfibers together for purposes of maintaining the molded shape of the nonwoven web. Because the thermally-bonded staple fibers and the non-thermally bonded electrically-charged microfibers are present in the same layer, the web can be molded into a variety of configurations without using thermally-bonded bicomponent microfibers. There also is no need for a separate supporting structure or a need to join the layer of microfibers to the additional structure.

The filter elements of the present invention can yield a desirable combination of good filtration performance and good structural integrity, even though the filter elements may be subjected to compression during the molding operation. The good performance and structural characteristics are able to be achieved despite previous thought that filtration parameters such as pressure drop and service life could be negatively impacted when a nonwoven web of polymeric microfibers was subject to additional handling such as from a molding operation. Previously known filtration structures, such as those described in the '368 patent to Braun et al., need to maintain a lofty web condition to obtain optimal filtration performance. The present invention, however, is able to demonstrate good mechanical and filtration properties, in conjunction with a simplified operation for creating a shaped filter element. The present invention therefore can produce a molded filter element that is a good candidate for use in a molded respiratory mask.

GLOSSARY

In reference to the invention, the following terms are defined as set forth below:

"denier" means the weight in grams of 9,000 meters of filament;

"electrically-charged" means the fibers possess electric charge that is capable of being measured and is present on the fibers for more than transitory duration;

"filter element" means a fluid permeable structure that is capable of removing contaminants from a fluid that passes through it;

"microfibers" mean fibers that have indeterminate length and that have an average geometric fiber diameter of about 15 micrometers ($\mu$m) or less;

"molded web" means a structure that is substantially larger in two dimensions than in a third and that has been formed into a desired shape such as a face mask, a furnace filter, a panel or series of panels, et cetera;

"molding temperature" means the temperature at which the web is heated to accomplish molding;

"non-thermally bonded" means the fibers do not substantially bond to adjacent contacting fibers after being heated to a temperature suitable for molding a web into which the non-thermally bonded fibers are contained;

"porous" means fluid permeable;

"solidity" means the percent solids in a web and is expressed as a unitless fraction where a greater number indicates a greater solids' fraction; and "softening temperature" means the lowest temperature at which a fiber component is softened to an extent that permits that fiber component to bond to another fiber and retain that bonded condition when cooled;

"staple fibers" mean fibers that have determinate length;

"thermally bondable fibers" mean fibers that can bond to adjacent contacting fibers after being heated to at least above their softening temperature and being subsequently cooled;

"thermally bonded fibers" mean fibers that are bonded to adjacent contacting fibers after being heated to at least above their softening temperature and being subsequently cooled.

DETAILED DESCRIPTION OF PREFERRED EMBODIMENTS

Figure 1:
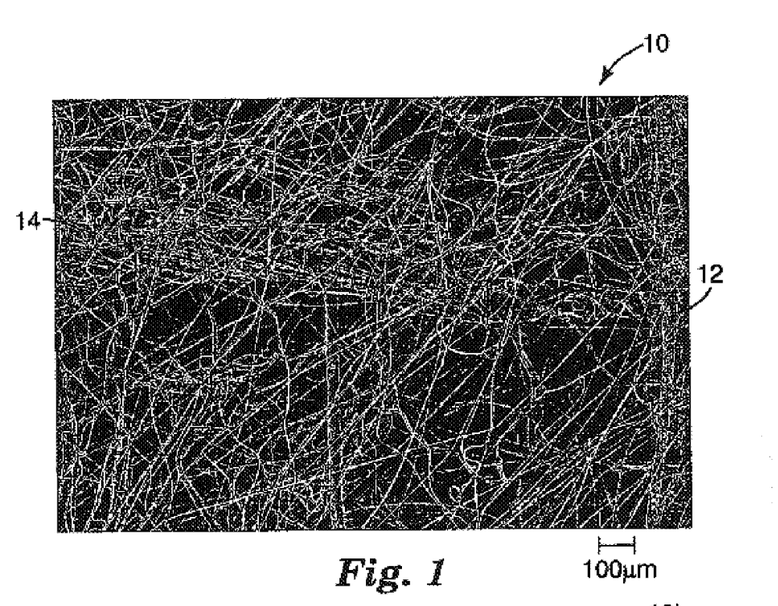
FIG. 1 is a photograph (magnified 100×) of a nonwoven web 10 that may be molded to produce a filter element according to the present invention.

FIG. 1 shows a nonwoven web 10 that can be used to produce a molded filter element in accordance with this invention. As shown in the photo, the web 10 may comprise thermally bondable staple fibers 12 and non-thermally bonded microfibers 14. The staple fibers 12 are distributed throughout the network of non-thermally bonded microfibers 14. The thermally bondable staple fibers 12 provide a more lofty, less dense web than a web made from the non-thermally bonded microfibers alone. The pre-molded web typically has a solidity of about 5 to 30%, more typically about 10 to 20%. In a preferred embodiment, the web comprises about 30 to 70 weight % thermally bondable staple fibers, and more preferably about 40 to 60 weight % thermally bondable staple fibers, based on the weight of the fibers in the web. The web also preferably comprises about 30 to 70 weight % non-thermally bondable microfibers, and more preferably about 40 to 60 weight % non-thermally bondable microfibers, based on the weight of fibers in the web. In a more preferred embodiment, there would be about 50 to 60 weight % microfibers, and about 40 to 50 weight % staple fibers. Thus, it is preferred that the web contain more microfibers than staple fibers by weight.

The staple fibers 12 are thermally bondable, which allows these fibers to bond to adjacent contacting fibers after they have been heated above their softening temperature and have been cooled. The staple fibers have a determinate length, that is, they are typically machine cut to a specific predetermined or identifiable length. They are also made by processes where the fiber diameter more closely resembles the diameter of the orifice through which the fiber is extruded. The length of the staple fibers typically is less than 2 feet or 0.61 meters, or is less than 1 foot or 0.305 meters. The staple fibers preferably would have a length of about 1 to 8 centimeters (cm) (0.4 inches to 3.2 inches), more preferably about 2.5 cm to 5 cm (1 to 2 inches). The average geometric fiber diameter for the staple fibers is generally greater than about 15 $\mu$m on average, and typically is greater than 20, 30, 40, or 50 $\mu$m on average. This fiber diameter can be calculated according to the test set forth below. The staple fibers also generally have a denier of greater than about 3 g/9,000 m, and greater than about 4 g/9,000 m. At the upper limit, the denier is typically less than about 50 g/m and more commonly is less than about 20 g/m to 15 g/m.

The staple fibers are typically of the synthetic variety so that they can be bonded to each other during the molding process. The staple fibers typically are made from polymeric materials that soften and bond to other fibers when heated and cooled. Staple fibers that are suitable for use in the present invention may be prepared from polyethylene terephthalate, polyester, polyethylene, polypropylene, copolyester, polyamide, or combinations thereof. The staple fibers typically retain much of their fiber structure after bonding. The staple fibers may be crimped fibers like the fibers described in U.S. Pat. No. 4,118,531 to Hauser. Crimped fibers have a continuous wavy, curly, or jagged character along their length. The staple fibers preferably comprise crimped fibers that comprise about 10 to 30 crimps per cm (5.1 to 11.9 crimps per inch). The staple fibers may be single component fibers or multi-component fibers. Examples of commercially available single component thermally bondable staple fibers include KOSA T-255, T-259, T-271, and T-295, available from Kosa of Charlotte, N.C.; and Type 410 PETG, Type 110 PETG, available from Foss Manufacturing Inc., of Hampton, N.H. The multi-component fibers may have two or more fiber components, where at least one of the components will soften during heating to allow the staple fibers to be bonded to each other at points of fiber intersection. The multi-component fibers may be bicomponent fibers that have a coextensive side-by-side configuration, a coextensive concentric sheath-core configuration, or a coextensive elliptical sheath-core configuration. Bicomponent fibers are generally characterized by having two major fiber components. Examples of bicomponent fibers that may be used as the thermally bonded staple fibers in the present invention include KOSA T-254, T-256, and polypropylene/polyethylene bicomponent fibers (CHISSO ES, ESC, EAC, EKC) and polypropylene/polypropylene bicomponent fiber (CHISSO EPC) and polypropylene/polyethylene-terephthalate bicomponent fiber (CHISSO ETC) sold by Chisso Inc. of Osaka, Japan.

The microfibers that are used in the present invention have an average geometric fiber diameter of about 15 µm or less, more typically about 12 µm or less. Unlike staple fibers, which have specific or identifiable length, the microfibers have an indeterminate length. The average geometric fiber diameter of the microfibers generally is about 3 to 10 µm.

The microfibers may take the form of an entangled web of electrically-charged melt-blown microfibers. Melt-blown microfibers or BMF can be created by extruding a fiber-forming material through a die orifice into a gaseous stream—see, for example, U.S. Pat. No. 4,215,682 to Kubik et al. Melt-blown microfibers, when randomly entangled in a web, typically have sufficient integrity to be handled by themselves as a mat. But they typically cannot be molded into a desired configuration without adversely impacting the filtration properties of the web. Examples of materials that may be used to make melt-blown microfibers are disclosed in U.S. Pat. No. 5,706,804 to Baumann et al., U.S. Pat. No. 4,419,993 to Peterson, U.S. Re. Pat. No. Re. 28,102 to Mayhew, U.S. Pat. Nos. 5,472,481 and 5,411,576 to Jones et al., and U.S. Pat. No. 5,908,598 to Rousseau et al. Blown microfibers may be prepared from essentially any thermoplastic fiber-forming resin. To ensure that the webs maintain satisfactory electret properties or charge separation, the microfibers are formed from non-conductive resins, that is, resins having a volume resistivity of $10^{14}$ ohm-centimeters or greater at room temperature (22° C.). Preferably, the volume resistivity is about $10^{16}$ ohm-cm or greater. Resistivity of the polymeric fiber-forming material can be measured according to standardized test ASTM D 257–93. The fiber-forming material used to form the melt blown fibers also should be substantially free from components such as antistatic agents that could increase the electrical conductivity or otherwise interfere with the fiber's ability to accept and hold electrostatic charges. Some examples of polymers that may be used in the polymeric fiber-forming material include thermoplastic polymers containing polycarbonates, polyesters, polyamides, polyurethanes, block copolymers such as styrene-butadiene-styrene and styrene-isoprene-styrene block copolymers, and polyolefins such as polypropylene, polybutylene, and poly(4-methyl-1-pentene), or combination of such resins. For filtration applications, the fibers are commonly made from poly-4-methyl-1 pentene and/or polypropylene. Preferably, the melt-blown microfibers are prepared from the homopolymer polypropylene because of its ability to retain electric charge, particularly in moist environments.

In addition to thermally bonded staple fibers and non-thermally bonded microfibers, filter elements of the present invention may comprise non-thermally bonded staple fibers made from, for example, polyester and/or polypropylene, including viscose rayon and FR fibers for absorbing moisture or providing flame retardancy.

The fibrous materials may contain additives to enhance filtration performance, including the additives described in U.S. Pat. Nos. 5,025,052 and 5,099,026 to Crater et al. and may also have low levels of extractable hydrocarbons to improve filtration performance—see, for example, U.S. Pat. No. 6,213,122 to Rousseau et al. Fibrous webs also may be fabricated to have increased oily mist resistance as shown in U.S. Pat. No. 4,874,399 to Reed et al., and in U.S. Pat. Nos. 6,238,466 and 6,068,799, both to Rousseau et al. The fibrous webs may be fluorinated as described in International Publication WO 00/01737. In a preferred embodiment for filtering contaminants in an oily mist environment, the fibers have fluorine atoms at the surface of the fibers as taught in U.S. Pat. Nos. 6,409,806, 6,398,847 B1, and 6,397,458 to Jones et al.

Figure 2:
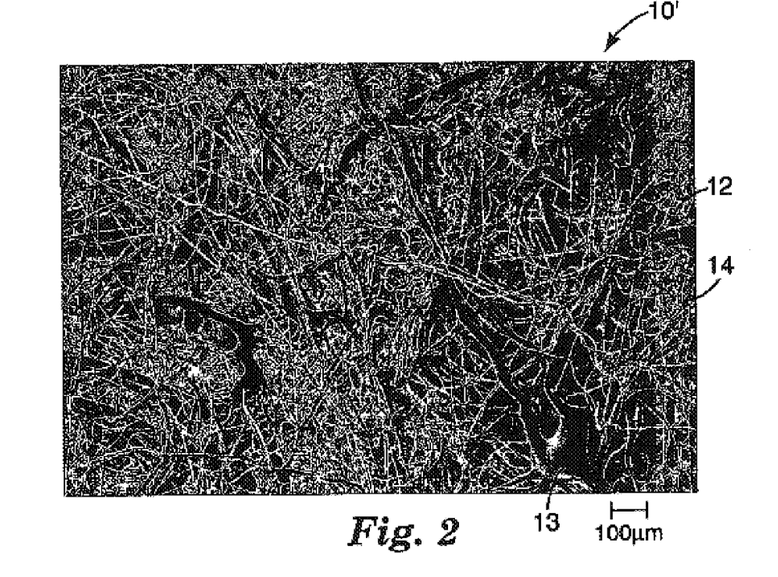
FIG. 2 is a photograph (magnified 100×) of a web 10' that has been molded to produce a filter element according to the present invention.

FIG. 2 shows an enlarged photograph of a molded web 10' that contains both thermally bonded staple fibers and non-thermally bonded microfibers. As shown, the staple fibers 12 are bonded to each other at points of fiber intersection 13. The microfibers 14, on the other hand, have generally maintained their unbonded orientation. Although the staple fibers 12 are bonded to each other at fiber intersection points, the bonds do not need to occur at all such points. Fiber bonding only need to occur at a sufficient number of intersections to allow the molded product to retain its desired shape for more than transitory duration. The bonding between the staple fibers provides a semi-rigid three-dimensional lattice of fibers in the molded web 10'. Because the staple fibers are heated above the softening temperature of the bonding component in the fibers, and perhaps to their melting temperature, the bonding component(s) of the fibers softens and merges together at a sufficient number of points where the fibers contact each other 13. To avoid damaging or otherwise altering the integrity of the microfibers during the molding process, the web is molded adequately below the softening temperature of essentially all components of the microfibers. Although the microfibers that have been produced by a melt-blowing technique will tend to bond to, or become seriously entangled with, each other during the melt-blowing process, the microfibers generally do not become bonded to each other during the heating process of the molding operation. The microfibers may, however, bond to the staple fibers when the bonding component(s) in those fibers softens and subsequently hardens. As shown, the staple fibers 12 melt and coalesce at points of fiber intersection 13. It is this bonding of the staple fibers that makes a major contribution to the shaped structure of the molded product. The molded product 10' comprises staple fibers and microfibers in essentially the same weight percentages as the non-molded web described above with reference to FIG. 1.

Molded filter elements of the present invention may have a thickness of about 1.0 to 4 mm. Although larger thicknesses of up to 6 mm may be produced, the filter element will commonly be approximately 1.0 to 3.5 mm thick. It has been discovered in this invention that good filtration performance can be achieved for the inventive molded product at thicknesses that are about 1.3 to 3.0 mm. The molded filter element also may have a solidity of about 5 to 30%, and typically about 10 to 20%. The basis weight of the molded filter element can be about 50 to 300 grams per square meter ($g/m^2$), typically about 100 to 200 $g/m^2$.

Figure 3:
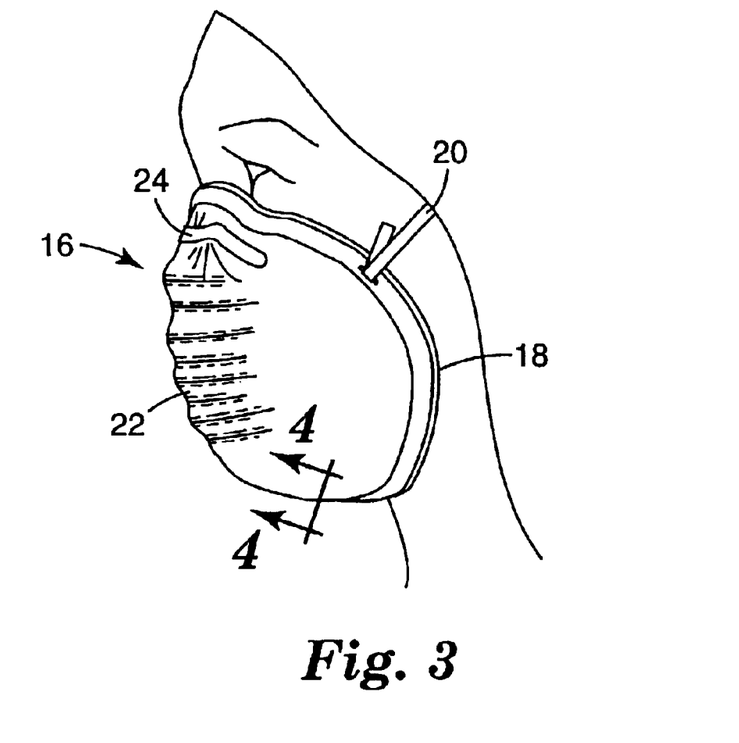
FIG. 3 is a side view showing an example of a filtering face mask 16 of the present invention being worn by a person.

FIG. 3 shows one example of a molded product that can be produced from a molded web such as the one shown in FIG. 2. As illustrated, the molded product may take the shape of a cup-shaped respiratory mask 16 that fits over the nose and mouth of a wearer. The face mask 16 may have an exhalation valve (not shown) disposed centrally on the mask body to allow exhaled air to become rapidly purged from the mask interior. The mask 16 may be configured in a generally cup-shaped configuration when worn to fit snugly over a person's nose and mouth. The mask 16 is desirably formed to maintain a substantially leak-free contact with the wearer's face at its periphery 18. The mask 16 may be drawn tightly against the wearer's face around the mask periphery by a harness such as bands 20 that extend behind the wearer's head and neck when the mask is worn. The mask 16 forms an interior gas space between the mask body and the wearer's face. This interior gas space is separated from the ambient or atmospheric air by the mask body 22. Air that is inhaled by the wearer, therefore needs to pass through the mask body 22 before it can enter the wearer's breathing track. The mask 16 also may have a conformable nose clip 24 that is mounted on the inside or outside of the mask body, or possibly between additional layers, if present, to provide a snug fit over the nose and where the nose meets the cheekbone.

The filtering face mask 16 does not necessarily need to exhibit the configuration shown in FIG. 3. The mask may take on other configurations such as the flat-fold mask shown in U.S. Pat. Nos. 6,026,511 6,123,077, and 6,394,090 B1. Or it may have the expanded cup-shaped configuration as shown in U.S. Pat. No. 4,827,924 to Japuntich. The nose clip 24 may have the configuration described in U.S. Pat. No. 5,558,089 to Castiglione. The mask also could have a thermochromic fit indicating seal at its periphery to allow the wearer to easily ascertain if a proper fit has been established—see U.S. Pat. No. 5,617,849 to Springett et al. In addition, the respirator filter element could take on configurations other than a molded mask body. The filter element could be molded for use in a filter cartridge that has a particular shape, for example, a curved shape to reside closer to a wearer's face. The filter cartridge could be removably attached to a face piece that fits over the nose and mouth of a person such as the elastomeric mask body described in U.S. Pat. No. 5,062,421 to Burns and Reischel.

Figure 4:
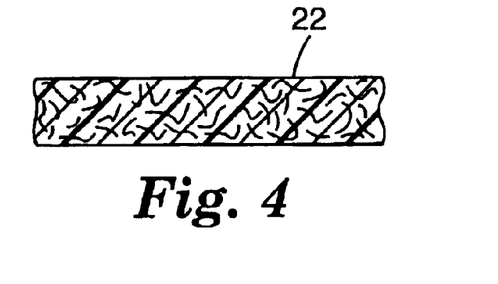
FIG. 4 is a sectional view that is taken along the lines 4—4 of FIG. 3.

FIG. 4 shows a cross-section of the mask body 22 of FIG. 3. As shown, the mask body 22 only has one layer to provide it with its filtration properties and with its shape-retention properties. As indicated above, masks that have been made in the past have generally included a separate supporting structure or layer to furnish the mask with its structural integrity. The present invention, however, can provide a filtering face mask that demonstrates very good filtration performance without using separate shaping layer(s) and microfiber-containing filter layer(s). The filtration and structural properties may be incorporated into a single layer that includes both thermally bonded staple fibers and non-thermally bondable microfibers. Although good filtration can be achieved in a single-layered product, other layers such as layers of additional filter media, including layers of electrically-charged BMF webs may be used to enhance the filtration properties. Such webs have been previously described—see U.S. Pat. No. 4,795,668 to Krueger et al, U.S. Pat. No. 4,874,399 to Reed et al, U.S. Pat. No. 4,988,560 to Meyer et al, and U.S. Pat. No. 5,496,507 to Angadjivand et al. Other examples of filter media that could be used include those that are described in U.S. Pat. Nos. 5,898,981, 5,419,953, 4,798,850, 4,215,682, 4,178,157, 3,998,916, and 3,644,605. These basic kinds of filter media may include multi-layer composite air filtration media that uses a flame-retardant pre-filter layer, a blended-fiber filter material, and webs of fibrillated electrically-charged fibers. In addition, particulate matter, such as active particulate (which is particulate matter that is capable of serving a function, including adsorption, absorption, catalysis, etc.), for example, activated carbon, may be introduced into the web—see, e.g., U.S. Pat. No. 3,971,373 to Braun—to produce a filter element that has the capacity to remove not only particulate matter but also gaseous contaminants such as acid gas, organic vapor, ammonia, and combinations of such gases.

Filter elements of the invention can achieve very good filtration performance, as noted by the Quality Factor, $Q_F$, parameter described below. $Q_F$ values greater than 0.30 (mm $H_2O)^{-1}$, and still greater than 0.40 (mm $U_2O)^{-1}$, and even greater than 0.70 or 0.80 (mm $H_2O)^{-1}$ may be obtainable.

In addition to being used in a respiratory mask, the present invention may provide other shaped structures, including air filters that take on a corrugated or pleated shape for use as, for example, a furnace filter, a cabin air filter such as for use in an automobile, boat, or airplane and room air filters, including air conditioning filters.

Figure 5:
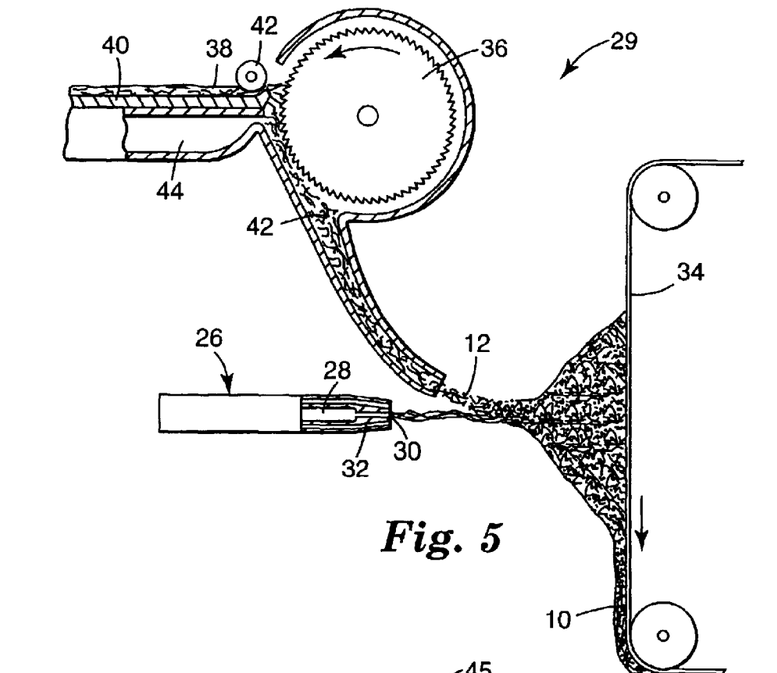
FIG. 5 is a partial sectional view of an apparatus 29 that may be used to form a web 10 that contains both staple fibers and microfibers.

FIG. 5 shows one arrangement of an apparatus 29 that is useful for preparing a web 10 that contains both staple fibers and melt-blown microfibers. This apparatus 29 prepares webs of melt-blown microfibers by extruding molten fiber-forming material through a die orifice 30. Solution-blown, and other types of microfibers, may also be used to make microfibers suitable for use in the present invention. The microfiber-blowing portion of the illustrated apparatus can be a conventional structure as taught, for example, in Wente, Van A. *Superfine Thermoplastic Fibers*, 48 Indus. Engn. Chem. 1342 et. seq. (1956), or in Report No. 4364 of the Naval Research Laboratories (May 25, 1954) entitled *Manufacture of Superfine Organic Fibers* by Wente, V. An.; Boon, C. D.; and Fluharty, E. L. Such a structure includes a die 26 that has an extrusion chamber 28 through which a liquefied fiber-forming material is advanced. Die orifices 30 may be arranged in line across a forward end of the die face through which the fiber-forming material is extruded. Cooperating gas orifices 32 are located adjacent to the die 30 and allow a gas, typically heated air, to be forced at very high velocity through it. The high-velocity gaseous streams draw out and attenuate the extruded fiber-forming material. The fiber-forming material then solidifies as the microfibers travel to a collector 34. The collector 34 typically is a finely perforated screen, which in this case is on a closed-loop belt. The collector can take alternative forms, however, such as a flat screen or a drum or cylinder. The collector also can have a generally cylindrical forming surface that rotates about an axis and moves in the direction of the axis such that a selected point on the collector moves in a helical pattern—see U.S. Pat. No. 6,139,308 to Berrigan et al. A gas-withdrawal apparatus may be positioned behind the screen to assist in depositing the fibers and removing the gas.

The thermally-bondable staple fibers 12 may be introduced into the stream of blown microfibers 14 in the illustrative apparatus shown in FIG. 5 through use of a lickerin roll 36 disposed above the microfiber-blowing apparatus. A web 38 of bulking fibers, typically a loose, nonwoven web such as prepared on a garnet machine or "Rando-Webber", is propelled along a table 40 under a drive roll 42 where the leading edge engages against the lickerin roll 36. The lickerin roll 36 turns in the direction of the arrow and picks off fibers from the leading edge of the web 38, separating the fibers from one another. The picked fibers are conveyed in an air stream through an included trough or duct 42 and into the stream of blown microfibers where they become mixed with the microfibers. The air stream is generated inherently by rotation of the lickerin roll, or the air stream may be augmented by use of an auxiliary fan or blower operating through a duct 44.

The mixed stream of staple fibers and microfibers then continues to the collector 34 where the fibers form a web 10 of randomly intermixed and intertangled fibers. Under close examination, the staple fibers and microfibers may be thoroughly mixed—for example, free of clumps of staple fibers, that is, collections of staple fibers of a centimeter or more in diameter such as would be obtained if a chopped section of multi-ended tow of staple fiber were unseparated or if staple fibers were balled together before being introduced into the microfiber stream. The resulting web 10 may be peeled off the collector and wound into a storage roll and may be subsequently processed in cutting, handling, or molding operations.

The prepared composite web may consist of a single layer deposited by the apparatus as shown, or may be a multi-layer product in which the layers are typically indistinguishable to at least casual inspection. Multi-layer products can be formed either by passing the collected web under a mixing and depositing apparatus such as illustrated in FIG. 5 two or more times or by having additional mixing and depositing apparatus disposed along the length of a collecting belt.

The inventive filter elements have an electrical charge imparted to the web to improve its filtering efficiency. The electric charge may be included on the microfibers alone, or on both the microfibers and staple fibers. If the staple fibers are also desired to be charged, they need to have a nonconductive surface so that any charge that is placed on the fibers does not dissipate. Thus, the staple fibers should be made from a non-conductive polymeric material as described above with respect to the microfibers. Filter media that utilizes electrically-charged meltblown microfibers is disclosed, for example, in U.S. Pat. No. 5,968,635 to Rousseau, et. al. The fibers can include surface modifying agents such as fluorine to improve oily mist filtration performance—see U.S. Pat. No. 6,398,847 B1 to Jones et al. Electric charge can be imparted to nonwoven fibrous webs using known techniques described in, for example, U.S. Pat. No. 4,215,682 to Kubik et al., U.S. Pat. No. 4,592,815 to Nakao, and U.S. Pat. No. 5,496,507 to Angadjivand et al. These methods may include hydrocharging as described in the '507 patent to Angadjivand et al. or may include corona charging as described in the '815 patent to Nakao, or combinations of such techniques. In addition, tribocharging techniques may be used as described in U.S. Pat. No. 4,798,850 to Brown et al. More recent charging techniques are also described in U.S. Pat. No. 6,375,886 B1 to Angadjivand and U.S. Pat. No. 6,406,657 to Eitzman et al. and in U.S. patent application Ser. Nos. 09/416,216 and 09/548,892, published as International Patent Publications WO 01/27381 and WO 01/80257, respectively. These newer techniques may include use of non-aqueous polar liquids and other methods of achieving sufficient contact between the water and/or polar liquid and the fibers. A known hydrocharging method includes impinging a stream of water droplets on a web at a pressure sufficient to provide filtration enhancing electret charge. The pressure necessary to achieve optimum results may vary depending on the type of sprayer used, the type of polymer from which the web is formed, the concentration of additives to the polymer, and the thickness and density of the web, and whether pretreatment such as corona surface treatment is carried out before hydrocharging. Generally, pressures in the range of about 10 to 500 psi (69 to 3450 kPa) are suitable. Preferably, the water used to provide the water droplets is relatively pure. Distilled or deionized water is preferable to tap water.

Figure 6:
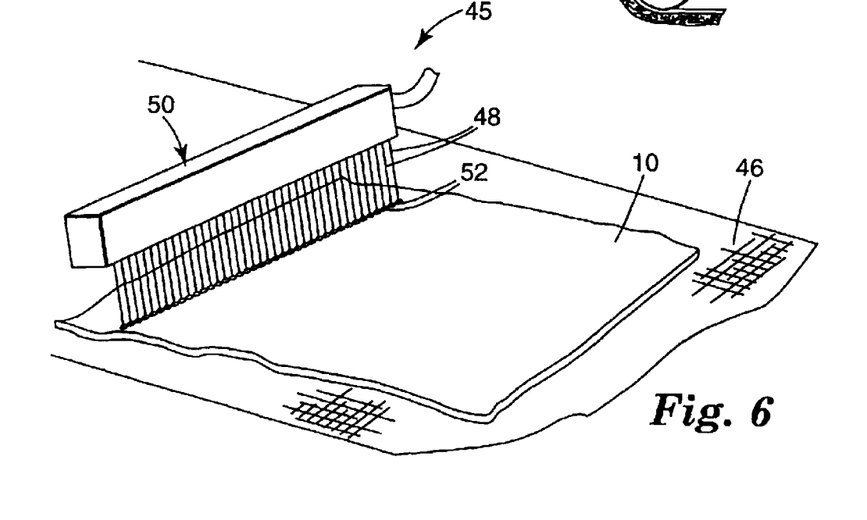
FIG. 6 is a perspective view of a water jet spray apparatus that may be used to impart electric charge to a fibrous web 10.

FIG. 6 shows an example of a suitable spray means 45 for charging a web. The fibrous web 10 is transported on support means 46 that may be in the form of a belt, preferably porous, such as a mesh screen or fabric. Water jets 48 in water jet head 50 provide the water spray with a pump (not shown) providing the water pressure. Water jets 48 impinge on web 10 at impingement points 52. Preferably, a vacuum is provided beneath a porous support to draw the spray through the web and to reduce energy drying requirements.

Further examples of suitable spray means for charging the nonwoven webs include nebulizers like the devices shown in the '507 patent to Angadjivand et al. In this device, water, which is provided through a water line, and pressurized air, which is, provided through air line, are supplied to a nozzle that impacts the web with a spray mist pump action sprayers where a pump handle forces water provided by water supply means through nozzle to provide a spray mist.

The amount of charge imparted to the web may be measured using known procedures, including thermally stimulated discharge (TSD) techniques—see, for example, U.S. Pat. No. 6,375,886 B1 to Angadjivand et al. The molded electret filter preferably contains fibers that exhibit a persistent electric charge, typically a charge that persists for the intended service life of a filter element.

Figure 7:
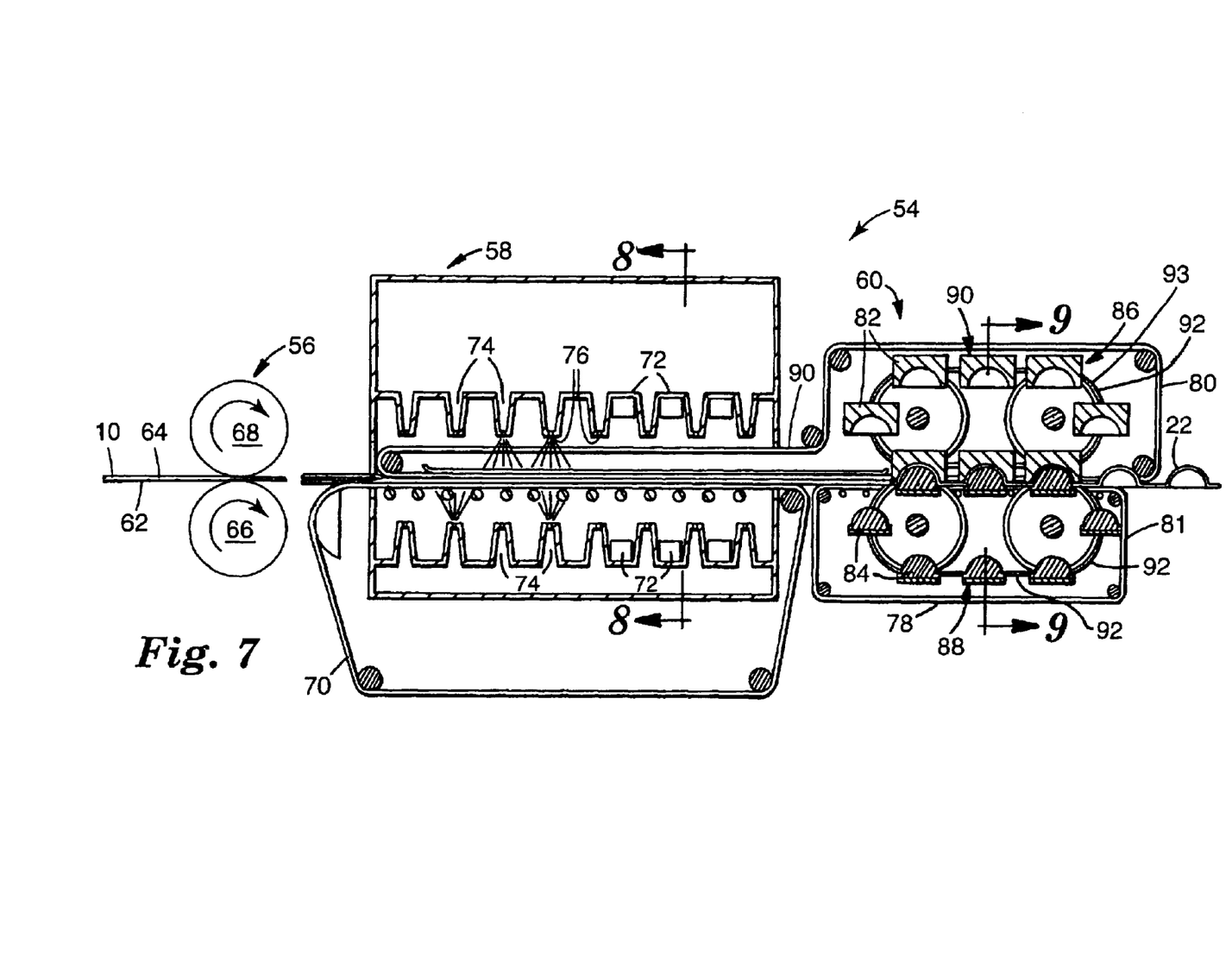
FIG. 7 is a side view, in partial cross-section, of an apparatus 54 that may be used for forming a face mask body 22 according to the present invention.
Figure 8:
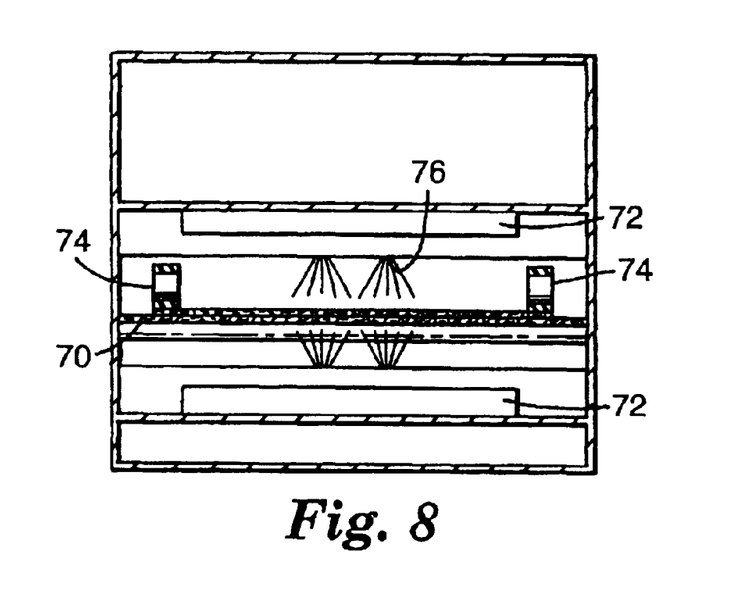
FIG. 8 is a cross-sectional view that has been taken along lines 8—8 of FIG. 7.
Figure 9:
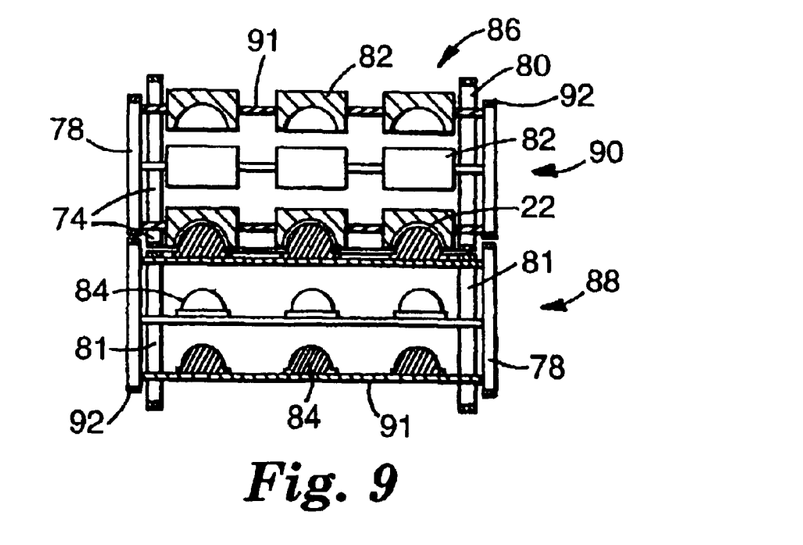
FIG. 9 is a cross-sectional view that has been taken along lines 9—9 of FIG. 7.

FIGS. 7–9 illustrate an apparatus 54 for forming shells 22 for face masks in accordance with a method of this invention. Shells 22 may be produced by passing a non-woven fibrous web 10 through an optional preskinning stage 56, a heating stage 58, and a cold molding stage 60. Optionally a smoothing or cover web (not shown) may be passed in superimposed relation to web 10 to provide a more comfortable feel when in contact with the wearer's face. An example of a suitable cover web is described in U.S. Pat. No. 6,041,782 to Angadjivand et al. The cover webs may be made from spunbond fibers or meltblown fibers, including microfibers.

At preskinning stage 56, web 10 is heated to an extent that the bonding component(s) of the staple fibers on web surfaces 62 and 64 are softened. The lower surface 62 and the upper surface 64 of web 10 contact heated calender rolls 66 and 68 to soften the bondable components of the fibers. Upon leaving calender rolls 66 and 68, the softened components of the fibers harden, and the fibers on surfaces 62 and 64 become bonded to each other. Web 10 is then placed on a moving oven belt 70 and enters the heating stage 58.

At heating stage 58, infra-red (IR) heaters 72 and hot air impingement 74 through perforations 76 heat the thermally bondable fibers in web 10 to soften the bonded components of the fibers throughout the web. Oven belt 70 has a mesh construction that permits the IR heat and hot air impingement to impinge on surfaces 62 and 64. The molding/heating conditions should be carefully controlled such that the microfiber components are preserved in a non-thermal bonded state. This is accomplished by preventing the autogenous bonding of the microfiber component during the molding process. Thermal bonds, such as provided by the staple fibers, provide a semi-rigid three-dimensional lattice of fibers in the molded filter element. The lattice of thermal bonded fibers maintains the mask in its molded shape without substantially inhibiting airflow through the fibrous network.

After heating, web 10 is passed to cold molding stage 60 while the bonded components of the fibers in web 10 are still soft. Web 10 is then transported on belts 78 and 80 and is placed between unheated molding members 82 and 84 where it is then molded to the cup-shape shells 22 or more particularly to the shape of face masks 22. A ferris wheel type arrangement 86 may be employed to provide a continuous molding process. Ferris wheel arrangement 86 includes a first and a second rotating apparatus, 88 and 90 respectively. Molding members 82 and 84 turn in a counter-clockwise and clockwise rotation, respectively and are each driven by a chain 92 on sprockets 78. At the point of molding, members 82 and 84, come together to shape web 10 into cup-shaped shells 22. The apparatus shown in FIGS. 7–9 is more fully described in U.S. Pat. No. 5,307,796 to Kronzer et al.

Filter elements and face masks prepared in accordance with the present invention have the shaping and filtration layers integrally joined together, that is, shape retention and good filtering performance are provided in a single molded web and not two separate webs or layers that are subsequently joined together, typically by a perimeter edge seal. The integral nature of inventive filter element will not allow the shaping and filtration aspects to be physically separated without destroying the filter element itself.

EXAMPLES

The following test methods were used to evaluate the webs and molded filter elements:

Particulate Penetration with Sodium Chloride

Penetration and pressure drop for individual molded filter was determined by using an AFT Tester, Model 8130, from TSI Incorporated, St. Paul, Minn. Sodium Chloride (NaCl) at a concentration of 20 milligrams per cubic meter (mg/m$^3$) was used as a challenge aerosol. The aerosol challenges were delivered at a face velocity of 13.8 centimeters per second (cm/sec). Pressure drop over the molded filter specimen was measured during the penetration test and is reported in millimeters water (mm H$_2$O).

Average Geometric Fiber Diameter

Determining the average geometric fiber diameter for fibers used in webs for the invention can be carried out by image analysis of photomicrographs of a web specimen.

Web specimens were prepared by mounting a web sample on a scanning electron microscope stub and vapor-plating the fibers with approximately 100 Angstroms (Å) of gold/palladium. Plating was done using a DENTON Vacuum Desk II Cold Sputter apparatus (DENTON Vacuum, LLC, 1259 North Church Street, Moorestown, N.J., 08057, USA) with a 40 milliamp sputter cathode plating source at a chamber vacuum of 50 millitorr supplied with and Argon gas flow of 125–150 millitorr. Duration of the plating process was approximately 45 seconds. The plated sample was then inserted in a LEO VP 1450 scanning electron microscope (LEO Electron Microscopy Inc, One Zeiss Drive, Thournwood, New York, N.Y. 10594) and imaged at a 0° tilt, 15 kilovolt (kV) acceleration voltage, and 15 mm WD (working distance). Electronic images taken at 1000× magnification were used to determine microfiber diameters, and images taken at 500 or 250 magnifications were used to determine staple fiber diameters. Electronic images of the surface view of a specimen were analyzed using a personal computer running UTHSCSA (University of Texas Health Science Center in San Antonio) Image Tool for Windows version 2.00 available from the University of Texas. To perform an image analysis, the Image Tool was first calibrated to the microscope magnification and then the electronic image of a specimen processed so that individual fibers were measured across their width. Only individual fibers (no married or roping fibers) from each image are measured. A minimum of 18 to 20 staple fibers and a minimum of 66 up to 116 blown microfiber fibers were measured from each sample. Fiber size is reported as the mean diameter in micrometers (elm) for a given count number.

Molded Article Stiffness Determination

Stiffness of a molded filter element was measured using a King Stiffness Tester, available from Jaking & Co., Greensboro, N.C. Stiffness is determined as the force required to push a 2.54 cm—diameter, flat-faced, probe 8.06 cm (3.175 inches) depthwise into the filter element. The probe element was placed outside of the filter element and was oriented perpendicular to the platform onto which the filter element is placed for testing. For a molded filtering facemask, the facemask is placed on a platform with the convex side of the mask facing towards, and centered under, the probe. The probe was then descended towards the mask at a rate of 32 mm/sec, contacting the facemask and compressing it to the specified extent (21 millimeters). At the end of the full descention of the probe, the force (in Newtons) required to compress the article was recorded.

Quality Factor ($Q_F$)

Quality factor is determined as follows:

The penetration and pressure drop are used to calculate a quality factor "$Q_F$ value" from the natural log (Ln) of the NaCl penetration by the following formula:

$$Q_F \text{ (1/mm H}_2\text{O)}=-Ln\{\text{NaCl Penetration (\%)}/100\}/\text{Pressure Drop (mm H}_2\text{O)}$$

A higher initial $Q_F$ value indicates better initial filtration performance. Decreased $Q_F$ values effectively correlate with decreased filtration performance.

Example 1

A microfiber combination web used to form the molded filter element of the present invention was prepared from a blend of blown microfiber and thermally bondable staple fibers according to the process described in U.S. Pat. No. 4,118,531 (Hauser) and shown above in FIG. 5. The blown microfiber component of the combination web was prepared using a blend of polypropylene Fina type 3960 available from FINA Oil and Chemical Co., Houston, Tex. and poly-4-methyl-1-pentene type TPX-DX820 from Mitsui Petrochemical Industries, Ltd. of Tokyo, Japan. Chimassorb 944FL, available from Ciba Geigy Corporation, Hawthorne. N.Y., was included as a melt additive. The weight ratios of the components used in the blown microfiber component were 98% polypropylene, 1.2% TPX-DX820, and 0.8% Chimassorb 944FL. The basis weight of the microfiber component was 98 grams per square meter (g/m$^2$) and the average geometric fiber diameter was determined to be 4.4 $\mu$m according to the Average Geometric Fiber Diameter Test set forth above.

The thermal bonding bicomponent staple fibers, blended with the microfiber web to form the combination web, was CELBOND type T254 available from KOSA, Charlotte, N.C. The thermal bonding staple fiber had a linear density of 12 denier per filament (dpf) and had a cut length 38 mm. The average geometric fiber diameter was 33 µm. The staple fibers were introduced directly into the blown microfiber stream. The basis weight of the staple fiber component in the web was approximately 115 g/m². The total basis weight of the combination web was 214 g/m².

The combination web was hydrocharged according to the process described in U.S. Pat. No. 5,496,507 to Angadjivand et al. Hydrocharging was carried out by passing the web over a vacuum slot at a rate of 5 cm/sec while deionized water was sprayed onto the web at a hydrostatic pressure of about 620 kilo/Pascals (kPa) from a pair of Teejet 9501 sprayer nozzles (available from Spraying Systems Co., of Wheaton, Ill.) that were mounted about 10 cm apart and were centered about 7 cm above the vacuum slot. The web was then inverted, and the hydrocharging process was repeated to allow both sides of the web to be impinged with deionized water. Excess water was then removed by passing the web a third time over the vacuum slot. The web was then allowed to dry under ambient conditions by hanging.

Molding of the charged web was done by pressing the web between mating parts of a hemispherical cup-shaped heated mold that was about 55 mm in height and had a volume of about 310 cm³. In this hot-molding method, the top and bottom halves of the mold were heated to about 110° C., and the web was placed between the mold halves. The heated mold was then closed at a gap of 0.508 to 0.762 mm for approximately 15 seconds. After the specified time, the mold was opened and the molded product was removed.

Initial penetration and pressure drop of the molded face mask were measured using the AFT-8130 Particulate Penetration Test. Stiffness of the element was measured by Molded Article Stiffness Determination Test method. The test results are set forth in Table 1 below.

Example 2

A molded cup-shaped filter was prepared as described in Example 1 except that the bicomponent staple fiber was replaced with a blend of 70% CELBOND T254, (12 dpf, length 38 mm) and 30% polyester staple fiber, available as Type 295, (15 dpf, length 38 mm). The average geometric fiber diameter for the CELBOND T254 staple fiber was 33 µm, the average geometric fiber diameter of the Type 295 was 35 µm, and the average geometric fiber diameter of the microfibers was 4.4 µm. The basis weight of the staple fiber component was approximately 130 g/m². The total basis weight of the combination web was approximately 242 g/m². The molded cup-shaped filter element in this example was tested and the results are shown in Table 1 below.

Example 3

A molded filter was prepared as in Example 1 except that the bicomponent staple fiber was replaced with a blend of 49% CELBOND T254, (12 dpf, length 38 mm), 21% polyester staple fiber, available as Type 295, (15 dpf, length 38 mm), and 7% microfiber microwebs as described in U.S. Pat. No. 4,813,946 to Insley. The average geometric fiber diameter for the CELBOND T254 staple fiber was 33 µm, the average geometric fiber diameter of the Type 295 was 35 µm, and the average geometric fiber diameter of the microfibers was 4.4 µm. The melt additive, CHIMASSORB 944FL, that was used in this Example was at 1.0 weight % substituted for the combination of TPX-DX820/CHIMASSORB 944FL that was used in Example 1. The ratio of the polypropylene blown microfiber was raised to 99 weight %. The basis weight of the blown microfiber component on the combination web was approximately 52 g/m², the staple fiber was approximately 115 g/m², and the microfiber microwebs approximately 17 g/m². The total basis weight of the combination web was about 219 g/m². The article of Example 3 was tested for pressure drop, penetration, and stiffness, and the Quality Factor was determined:

TABLE 1

| Example Number | Pressure Drop (mm H₂O) | Penetration (%) | Stiffness (N) | Quality Factor $Q_F$ |
|---|---|---|---|---|
| 1 | 7.0 | 2.6 | 1.5 | 0.52 |
| 2 | 6.5 | 4.2 | 0.7 | 0.49 |
| 3 | 8.9 | 5.1 | 2.3 | 0.33 |

The data shown in Table 1 demonstrate that the pressure drop can be lowered with the addition of staple fiber and still have a molded shell stiffness greater than 0.5 Newtons. The addition of microfiber microwebs increases the pressure drop somewhat but then also increases the stiffness.

Example 4

A blown microfiber combination web was prepared as describe in Example 1 using 45 weight % blown microfiber, and 55 weight % thermal bonding bicomponent staple fiber. The average geometric fiber diameter for the staple and microfibers were 33 and 4.4 µm, respectively. In this example no TPX or CHIMASSORB 944 were added to the microfiber. The resulting combination web had a total basis weight of about 100 g/m². The web was treated on both faces by a fluorinating as described generally in WO 00/01737. The web of the example was fluorinated using a parallel-plate capacitively coupled plasma reactor Model 2480 from PlasmaTherm, St. Petersburg, Fla. The electrode gap was reduced from its 15 cm to 1.6 cm in PlasmaTherm for this experiment. The web sample was cut into sections of 20.3 cm by 30.5 cm and was placed on the powered electrode in the reactor. The reactor chamber was then closed and was pumped to a chamber pressure of about 1.3 Pa or less. Perfluoropropane $C_3F_8$ gas available from 3M Company, St. Paul, Minn. was metered into the chamber at a rate of 83 standard cm³/min until a chamber pressure of 40 Pa was reached. The electrodes of the chamber were then power to 1000 Watts using a 13.56 MHz from a power supply, and the web treated for one minute. The plasma was then extinguished, and the gas delivery discontinued. The chamber was then evacuated and was vented to atmospheric pressure before the sample was removed, turned over, and placed back in the reactor. The process was repeated, with both faces of the web receiving the equivalent treatment.

Then the treated web was charged and molded as described in Example 1, except that the belt speed for charging was 10.2 cm/sec and the water pressure was 827 kPa. The water jets were placed 15 cm above the belt. The molded web was tested for NaCl particle penetration and pressure drop, and the results are set forth in Table 2.

Example 5

A web was prepared as described in Example 4, except that in the fluorination treatment the $C_3F_8$ gas flow rate was 169 standard cm³/min, the chamber pressure was 66.7 Pa, with a 30 second treatment time for each face of the web. Two layers of the web were combined and molded as described in Example 1. The molded webs were tested for NaCl particle penetration and pressure drop, and the $Q_F$ value was calculated, and the results are given in Table 2:

TABLE 2

| Example | Basis Weight (g/m²) | Pressure Drop (mm H₂O) | Penetration (%) NaCl | Stiffness (N) | $Q_F$ |
|---|---|---|---|---|---|
| 4 | 100 | 5.5 | 0.769 | — | 0.89 |
| 5 | 200 | 12.7 | 0.013 | 0.35 | 0.70 |

The data shown above in Table 2 demonstrate that, in comparison to Examples 1–3, by fluorinating the web, the basis weight can be reduced while getting better filtration performance.

All patents and patent applications cited above, including international publications and documents cited in the Background section, are incorporated by reference into this document as if reproduced in full.

This invention may be suitably practiced in the absence of any element or item not specifically described above.

What is claimed:

1. A filter element that comprises:
a porous molded web that contains thermally bonded staple fibers and non-thermally bonded electrically charged microfibers, the porous molded web being retained in its molded configuration, at least in part, by bonds between the staple fibers at points of fiber intersection.

2. The filter element of claim 1, wherein the porous molded web contains about 30 to 70 weight percent thermally bondable staple fibers and contains about 30 to 70 weight percent non-thermally bondable microfibers.

3. The filter element of claim 1, wherein the porous molded web contains about 40 to 60 weight percent thermally bondable staple fibers and contains about 40 to 60 weight percent non-thermally bondable microfibers.

4. The filter element of claim 1, wherein the porous molded web contains about 50 to 60 weight percent microfibers and about 40 to 50 weight percent staple fibers.

5. The filter element of claim 1, wherein the porous molded web contains more microfibers than staple fibers by weight.

6. The filter element of claim 1, wherein the length of the staple fibers is less than 0.3 m.

7. The filter element of claim 6, wherein the length of the staple fibers is about 1 to 8 cm.

8. The filter element of claim 1, wherein the staple fibers have an average geometric fiber diameter of about 15 $\mu$m or greater.

9. The filter element of claim 8, wherein the average geometric fiber diameter for the staple fibers is greater than about 20 $\mu$m on average.

10. The filter element of claim 9, wherein the average geometric fiber diameter for the staple fiber, is greater than about 30 $\mu$m.

11. The filter element of claim 1, wherein the staple fibers have a denier that is greater than about 3 g/9,000 m.

12. The filter element of claim 1, wherein the staple fibers have a denier greater than 4 g/m and less than about 20 g/9,000 m.

13. The filter element of claim 1, wherein the staple fibers comprise a thermoplastic polymeric material.

14. The filter element of claim 13, wherein the staple fibers contain polyethylene terephthalate, polyester, polyethylene, polypropylene, copolyester, polyamide, or combinations thereof.

15. The filter element of claim 1, wherein the staple fibers are crimped polymeric fibers that have determinant length.

16. The filter element of claim 15, wherein the staple fibers have about 10 to 30 crimps per cm.

17. The filter element of claim 15, wherein the staple fibers include bicomponent fibers.

18. The filter element of claim 1, wherein the microfibers have an average geometric fiber diameter of about 3 to 10 $\mu$m.

19. The filter element of claim 1, wherein the microfibers are formed from a nonconductive resin that has a volume resistivity of $10^{14}$ ohm-cm or greater at room temperature.

20. The filter element of claim 19, wherein the microfibers are formed from a nonconductive resin that has a volume resistivity of $10^{16}$ ohm-cm or greater at room temperature.

21. The filter element of claim 19, wherein the microfibers comprise polypropylene, poly(4-methyl-1-pentene), polybutylene, or a combination thereof.

22. The filter element of claim 1, wherein the microfibers have fluorine atoms at the surface of the fibers.

23. The filter element of claim 22, wherein the microfibers are meltblown microfibers that contain polypropylene.

24. The filter element of claim 1, which has a thickness of about 1 to 4 mm.

25. The filter element of claim 1, which has a thickness or about 1.3 to 3 mm.

26. The filter element of claim 1, having a solidity of about 5 to 30 percent and a basis weight of about 50 to 300 g/m².

27. The filter element of claim 1, having a solidity of about 10 to 20 percent and a basis weight of about 100 to 200 g/mn².

28. The filter element of claim 1, exhibiting a Quality Factor greater than 0.40.

29. The filter element of claim 1, exhibiting a Quality Factor greater than 0.70.

30. A filtering face mask that is molded into a configuration to fit over the nose and mouth of a person and that comprises the filter element of claim 1.

31. A filtering face mask that comprises a porous mask body adapted to fit over the nose and mouth of a person, the porous mask body allowing air to pass therethrough for purposes of being filtered before being inhaled by a wearer of the filtering face mask, the mask body being formed from the filter element of claim 1.

32. A filter cartridge that contains the filter element of claim 1.

33. The filter cartridge of claim 32, wherein it is adapted to be attached to a face piece that fits over the nose and mouth of a person and that comprises an elastomeric mask body.

34. A method of making a filter element, which method comprises:
providing a pre-molded fibrous web that includes thermally bondable staple fibers and electrically charged non-thermally bonded microfibers; and
molding the fibrous web to an intended shape such that the thermally bondable staple fibers become thermally bonded to exhibit bonds at point of fiber intersection.

35. The method of claim 34, wherein the pre-molded web has a solidity of about 5 to 30 percent.

36. The method of claim 34, wherein the pro-molded web has a solidity of about 10 to 20 percent.

37. The method of claim 34, wherein the pre-molded web contains about 30 to 70 weight percent thermally bondable staple fibers and contains about 30 to 70 weight percent non-thermally bondable microfibers.

38. The method of claim 34. wherein the pre-molded web contains about 40 to 60 weight percent thermally bondable staple fibers and contains about 40 to 60 weight percent non-thermally bondable microfibers.

39. The method of claim 34, wherein the pie-molded fibrous web is provided by introducing thermally-bondable staple fibers into a stream of blown microfibers.

40. The method of claim 39, wherein the mixed stream of staple fibers and microfibers is gathered on a collector that forms a web of randomly intermixed and intertangled staple fibers and microfibers to provide the pre-molded fibrous web.

41. The method of claim 34, wherein the staple fibers and microfiber both have a non-conductive surface and are electrically charged.

42. The method or claim 34, wherein the intended shape is a cup-shaped mask body for a filtering face mask.

43. A method or making a filtering lace mask, which method comprises:
(a) providing a web that contains thermally bondable staple fibers and non-thermally bonded microfibers; and
(b) molding the web to produce a mask body that has the thermally bondable staple fibers bonded to adjacent contacting fibers and that has a shape adapted to allow the mask body to fit over the nose and mouth of a person.

44. The method of claim 43, wherein the pre-molded web has a solidity of about 5 to 30 percent.

45. The method of claim 43, wherein the pre-molded web has a solidity of about 10 to 20 percent.

46. The method of claim 43, wherein the pre-molded web contains about 30 to 70 weight percent thermally bondable staple-fibers and contains about 30 to 70 weight percent non-thermally bondable microfibers.

47. The method of claim 43, wherein the microfibers in the mask body are electrically charged.

48. The filter element claim 47, wherein the molded mask body contains about 30 to 70 weight percent thermally bondable or thermally bonded staple fibers and contains about 30 to 70 weight percent non-thermally bondable microfibers.

49. The filter element of claim 47, wherein the molded mask body contains about 50 to 60 weight percent microfibers and about 40 to 50 weight percent staple fibers.

50. The filter element of claim 49, wherein the molded mask body contains more microfibers than staple fibers by weight.

51. The filter element of claim 47, wherein the length of the staple fibers is about 1 to 8 cm.

52. The filter element of claim 51 wherein the staple fibers have an average geometric fiber diameter of about 15 $\mu$m or greater.

53. The filter element of claim 52, wherein the staple fibers have about 10 to 30 crimps per cm.

54. The filter element of claim 52, wherein the microfibers are meltblown and have an average geometric fiber diameter of about 3 to 10 $\mu$m.

* * * * *

UNITED STATES PATENT AND TRADEMARK OFFICE
CERTIFICATE OF CORRECTION

PATENT NO. : 6,827,764 B2
APPLICATION NO. : 10/205565
DATED : December 7, 2004
INVENTOR(S) : James E. Springett It is certified that error appears in the above-identified patent and that said Letters Patent is hereby corrected as shown below:

Column 8
Line 24, delete "(mm $U_2O$)" and insert -- (mm $H_2O$) --, therefor.

Column 12
Line 14, delete "(elm)" and insert -- ($\mu$m) --, therefor.

Column 15
Line 55, in Claim 10, delete "fiber," and insert -- fibers --, therefor.

Column 16
Line 25, in Claim 25, delete "or" and insert -- of --, therefor.
Line 32, in Claim 27, delete "$g/mn^{2.}$" and insert -- $g/m^2$. --, therefor.
Line 59, in Claim 34, delete "point" and insert -- points --, therefor.
Line 62, in Claim 36, delete "pro-molded" and insert -- pre-molded --, therefor.

Column 17
Line 1, in Claim 38, delete "34." and insert -- 34, --, therefor.
Line 5, in Claim 39, delete "pie-molded" and insert -- pre-molded --, therefor.
Line 14, in Claim 41, delete "microfiber" and insert -- microfibers --, therefor.
Line 14, in Claim 41, delete "non-conductive" and insert -- nonconductive --, therefor.
Line 16, in Claim 42, delete "or" and insert -- of --, therefor.
Line 18, in Claim 43, delete "or" and insert -- of --, therefor.
Line 18, in Claim 43, delete "lace" and insert -- face --, therefor.

Column 18
Line 3, in Claim 46, delete "staple-fibers" and insert -- staple fibers --, therefor.
Line 7, in Claim 48, delete "filter element" and replace with -- method --.
Line 7, in Claim 48, insert -- of -- before "claim".
Line 12, in Claim 49, delete "filter element" and replace with -- method --.

UNITED STATES PATENT AND TRADEMARK OFFICE
CERTIFICATE OF CORRECTION

PATENT NO. : 6,827,764 B2
APPLICATION NO. : 10/205565
DATED : December 7, 2004
INVENTOR(S) : James E. Springett It is certified that error appears in the above-identified patent and that said Letters Patent is hereby corrected as shown below:

Column 18
Line 15, in Claim 50, delete "filter element" and replace with -- method --.
Line 18, in Claim 51, delete "filter element" and replace with -- method --.
Line 22, in Claim 52, delete "filter element" and replace with -- method --.
Line 22, in Claim 52, after "51" insert -- , --.
Line 25, in Claim 53, delete "filter element" and replace with -- method --.
Line 27, in Claim 54, delete "filter element" and replace with -- method --.

Signed and Sealed this

Sixth Day of May, 2008

JON W. DUDAS
*Director of the United States Patent and Trademark Office*